United States Patent
Demia et al.

(10) Patent No.: US 6,799,469 B2
(45) Date of Patent: Oct. 5, 2004

(54) METHOD OF MEASURING FORCES IN THE PRESENCE OF AN EXTERNAL PRESSURE

(75) Inventors: Laurent Demia, Macon (FR); Jacques Dugray, Vaux le Penil (FR); Jean-Pierre Trioullier, Montgeron (FR)

(73) Assignee: Schlumberger Technology Corporation, Sugar Land, TX (US)

(*) Notice: Subject to any disclaimer, the term of this patent is extended or adjusted under 35 U.S.C. 154(b) by 60 days.

(21) Appl. No.: 10/332,280

(22) PCT Filed: Jul. 12, 2001

(86) PCT No.: PCT/EP01/08024

§ 371 (c)(1),
(2), (4) Date: Feb. 20, 2003

(87) PCT Pub. No.: WO02/06781

PCT Pub. Date: Jan. 24, 2002

(65) Prior Publication Data

US 2003/0154037 A1 Aug. 14, 2003

(30) Foreign Application Priority Data

Jul. 12, 2000 (FR) .............................................. 00 09349

(51) Int. Cl.[7] .............................. G01B 7/16; G01L 1/00
(52) U.S. Cl. ....................................................... 73/766
(58) Field of Search ............................. 73/152.59, 766, 73/708, 151, 800; 364/571.03

(56) References Cited

U.S. PATENT DOCUMENTS

| | | | | |
|---|---|---|---|---|
| 4,269,063 A | * | 5/1981 | Escaron et al. | ................ 73/151 |
| 4,547,691 A | * | 10/1985 | Valdois et al. | .............. 310/361 |
| 5,394,345 A | * | 2/1995 | Berard et al. | .......... 364/571.03 |
| 5,623,101 A | * | 4/1997 | Freitag | ......................... 73/708 |
| 6,006,608 A | * | 12/1999 | Renz et al. | .................... 73/800 |

* cited by examiner

Primary Examiner—Edward Lefkowitz
Assistant Examiner—Octavia Davis
(74) Attorney, Agent, or Firm—Brigitte L. Jeffery; John Ryberg

(57) ABSTRACT

The invention relates to a method of measuring a force F exerted on a piece in a given direction in the presence of external pressure Pe and temperature T. According to the invention:

Figure 1:
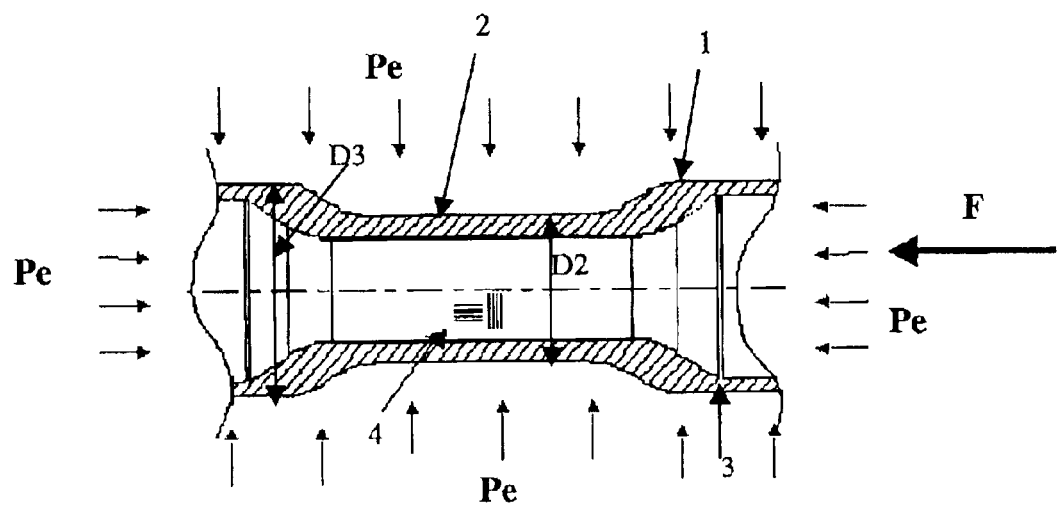

the response $R_{cap}$ of a deformation sensor to the total force exerted on the piece is measured;

said external pressure Pe and said temperature T are determined; and the force F exerted on the piece in said given direction is determined by a relationship between the response of said deformation sensor ($R_{cap}$) and a polynomial function of degree n of the pressure Pe [$f_n$(Pe)], said relationship being such that:

$$F = K \cdot R_{cap} - f_n(Pe)$$

where K is a constant determined by calibration of the sensor.

13 Claims, 1 Drawing Sheet

METHOD OF MEASURING FORCES IN THE PRESENCE OF AN EXTERNAL PRESSURE

The invention relates to a method for measuring forces exerted on a piece in a given direction, and in the presence of an external pressure which applies a force on said piece that is large compared with the forces to be measured.

A preferred application of the invention lies in measuring compression or tension forces exerted on a member such as a downhole tool or a drill string, e.g. when the member is put into place in a oil well or when it is extracted from such a well. The very high pressures existing at the bottom of a well then apply force on the member in question that is considerably greater than the force to be measured.

French patent application FR 99 11948 filed on Sep. 24, 1999 in the name of the Applicant describes a method of measuring forces F exerted on a piece in a first given direction and in the presence of an external pressure Pe, the method being designed to be practically insensitive to the forces generated by said pressure. In that method, the deformation of a wall is measured in an axial direction parallel to the first direction and at at least two points of different wall thicknesses in a second direction forming a non-zero angle with the first direction in order to compensate for the pressure effect.

Nevertheless, that method requires a plurality of strain gauges to be used in order to perform the various measurements. It also requires a piece to be used that is specially designed for the method, having walls of unequal thickness. Implementing such a method thus requires considerable instrumentation and its cost becomes large.

An object of the invention is to provide a method of measuring a force F exerted on a piece in a given direction in the presence of external temperature and pressure, said method being designed to compensate the forces generated by said temperature and said pressure.

According to the invention, this result is obtained by means of a method of measuring a force F exerted on a piece in a given direction, in the presence of an external pressure Pe and a temperature T, in which:

the response $R_{cap}$ of a deformation sensor to the total force exerted on the piece is measured;

said external pressure Pe and said temperature T are determined; and the force F exerted on the piece in said given direction is determined by a relationship between the response of said deformation sensor ($R_{cap}$) and a polynomial function of degree n of the pressure Pe [$f_n(Pe)$], said relationship being such that:

$$F = K \cdot R_{cap} - f_n(Pe)$$

where K is a constant determined by calibration of the sensor.

This method is particularly advantageous since it makes it possible to use pressure and deformation sensors known in the state of the art, thus making the measurements simple to perform while being very reliable. Furthermore, this calculation model makes it possible to obtain the value of the force F exerted on a piece in a given direction without using an additional deformation sensor and even when the external pressure Pe is large.

In an implementation of the invention, the force F exerted on the piece is determined using the following relationship:

$$F = K \cdot R_{cap} - \sum_{i=0}^{n} A_i(T) \cdot Pe^i$$

the coefficients $A_i(T)$ being a function of temperature T and being determined experimentally.

In an advantageous implementation of the invention, the coefficients $A_i(T)$ are polynomial functions of temperature and of order m such that:

$$A_i(T) = \sum_{j=0}^{m} B_{ij} \cdot T^j$$

where the coefficients $B_{ij}$ are determined experimentally.

Advantageously, the function $f_n(Pe)$ is a second-order polynomial function of pressure Pe (n=2).

In an advantageous implementation of the invention, the coefficients $A_i(T)$ are second-order polynomial functions of temperature (m=2).

This simplification of the polynomial functions $f_n(Pe)$ and $A_i(T)$ into second order polynomial functions (n=m=2) makes it possible to determine the force F accurately while minimizing calculations for compensating the effects of pressure and of temperature.

In an advantageous implementation of the invention, the coefficients $A_0(T)$ and $A_1(T)$ are assumed to be constant with temperature and the coefficient $A_2(T)$ is assumed to be zero.

This implementation makes it possible to simplify determining the coefficients $B_{ij}$ to a great extent while conserving very acceptable accuracy for the measurements.

Figure 2:
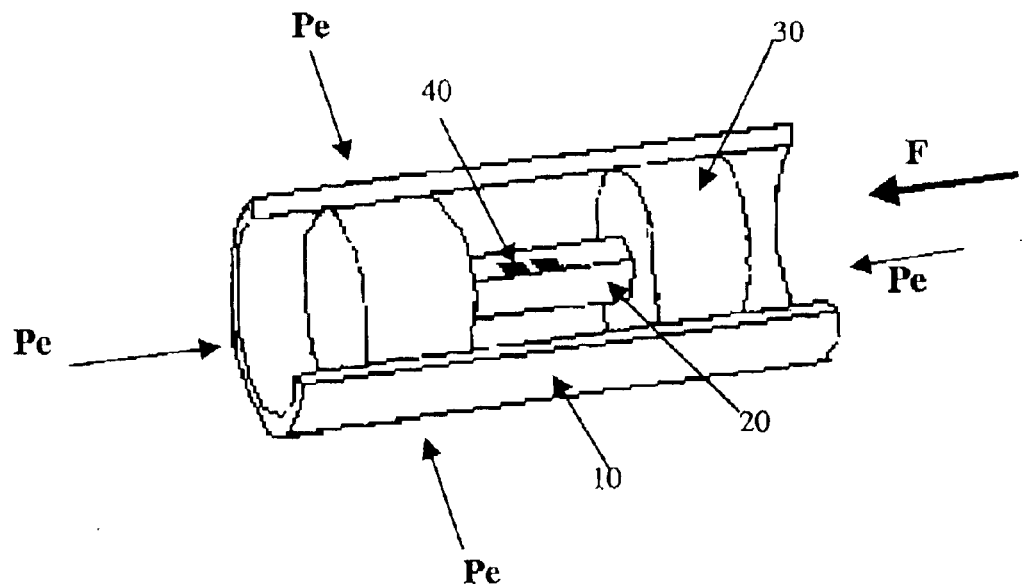

Other advantages and characteristics of the invention appear from the following description given with reference to the accompanying drawing, in which:

FIG. 1 shows an embodiment of a device enabling the measurement method of the invention to be implemented; and FIG. 2 shows another embodiment of a device enabling the measurement method of the invention to be implemented.

When some piece or member is placed in air, it is easy to detect a small force applied to said piece in a given direction, e.g. the vertical. When the same force is applied to some piece or member in the presence of an external pressure Pe and an external temperature T, the force detected in said direction corresponds to the force actually applied to the piece plus the product of the external pressure multiplied by the effective area of the piece on which the pressure Pe acts in the direction in question (and ignoring a coefficient that depends mainly on temperature).

When the pressure becomes very high, as is the case in particular at the bottom of an oil well, the force applied on the piece becomes negligible compared with the forces applied specifically in the same direction because of the surrounding external pressure Pe.

The method of the invention consists in measuring, independently, firstly the total force exerted on a piece in a given direction by means of a deformation sensor, the piece being subjected to surrounding temperature and pressure, and secondly the surrounding pressure Pe by means of a conventional pressure sensor and the temperature T by means of a conventional temperature sensor. Since the response of the deformation sensor is a function not only of the applied force F but also of the forces exerted by the external pressure at the measurement temperature, a force F is calculated which is "corrected" for the surrounding factors using a calculation model which is explained in greater detail below. Thus, after implementing the correction of the model, the force applied to the piece is obtained independently of the conditions in which the measurement is performed.

In an implementation of the invention, the deformation sensor is a Wheatstone bridge of the kind known in the state of the art, to which an input voltage Ve is applied and from which an output voltage Vs is measured. Under such circumstances, the response of the deformation sensor is given by the ratio Vs/Ve and it depends also on the input voltage Ve.

As mentioned above, the response of the deformation sensor $R_{cap}$ is a function of the applied force F, of the external pressure Pe, and of the temperature T. The response of the deformation sensor can then be written:

$$K.R_{cap} = F + f_n(Pe)$$

where K is a coefficient determined while calibrating the sensor, prior to performing any measurement. K depends essentially on temperature. $f_n(Pe)$ is a polynomial function of the external pressure Pe and of order n which can be written as follows:

$$f_n(Pe) = \sum_{i=0}^{n} A_i(T) \cdot Pe^i \quad [1]$$

The coefficients $A_i(T)$ are determined experimentally. It is assumed that the coefficients $A_i(T)$ are likewise polynomial functions of temperature T and of order m such that:

$$A_i(T) = \sum_{j=0}^{m} B_{ij} \cdot T^j$$

where the coefficients $B_{ij}$ are determined experimentally.
Whence:

$$f_n(Pe) = \sum_{i=0}^{n} \left( \sum_{j=0}^{m} B_{ij} \cdot T^j \right) \cdot Pe^i$$

In an implementation of the invention, it is assumed that the function $f_n(Pe)$ is a polynomial function of pressure Pe and of second order (n=2). This makes it possible to simplify very greatly the calculation for compensating the effects of pressure and temperature on the deformation sensor while maintaining values for the force F that are very close and accurate relative to the force actually applied on the piece. It is also possible to consider the coefficients $A_i(T)$ likewise to be second-order polynomial functions of temperature (m=2).

When n=m=2, these coefficients $A_i(T)$ can be written as follows:

$$A_0(T) = B_{02}.T^2 + B_{01}.T + B_{00}$$

$$A_1(T) = B_{12}.T^2 + B_{11}.T + B_{10}$$

$$A_2(T) = B_{22}.T^2 + B_{21}.T + B_{20}$$

With the coefficients $B_{ij}$ being determined experimentally.

In the form of a matrix, the model for the force F exerted on the piece in a given direction can thus be written as follows when n=2:

$$F = K \cdot R_{cap} - \begin{pmatrix} 1 & Pe & Pe^2 \end{pmatrix} \begin{pmatrix} A_0(T) \\ A_1(T) \\ A_2(T) \end{pmatrix} \quad [2]$$

When m is likewise equal to 2, this matrix equation becomes:

$$F = K \cdot R_{cap} - \begin{pmatrix} 1 & Pe & Pe^2 \end{pmatrix} \cdot \begin{pmatrix} B_{00} & B_{01} & B \\ B_{10} & B_{11} & B_{12} \\ B_{20} & B_{21} & B_{22} \end{pmatrix} \cdot \begin{pmatrix} 1 \\ T \\ T^2 \end{pmatrix} \quad [3]$$

By way of example, the units of the various terms can be such that: F is in N, Pe in Psi, T in ° C., K in N, $A_2(T)$ in $N/Psi^2$, $A_1(T)$ in N/Psi, and $A_0(T)$ in N. With a deformation sensor in the form of a Wheatstone bridge, the response signal $R_{cap}$ is of the type Vs/Ve where Vs and Ve are in volts.

The coefficients K and $B_{ij}$ (or $A_0(T)$, $A_1(T)$, and $A_2(T)$) are determined during calibration of the force sensor, immediately after it has been made. In an implementation, two types of test are thus performed:

a first test which is mechanical in traction/compression at constant temperature to determine the coefficient K; and a second test at pressure and temperature enabling the coefficients $A_0(T)$, $A_1(T)$, and $A_2(T)$ to be determined.

During the first test, which is mechanical and in which temperature T is constant, it is assumed that the pressure Pe applied to the sensor is zero. Returning to equation [2], the model is then written in the following form:

$$F = K.R_{cap} - A_0(T)$$

Plotting the curve of reference force as a function of sensor response, $F = f(R_{cap})$, makes it possible to determine the coefficient K as the slope of the straight line.

Thereafter, during the pressure test, it is assumed that the traction/compression force applied to the sensor is zero and that the only force that remains is the result of the external pressure Pe. The model is then written in the form:

$$0 = K.R_{cap} - A_2(T).Pe^2 - A_1(T).Pe - A_0(T)$$

Whence $$K.R_{cap} = A_2(T).Pe^2 + A_1(T).Pe + A_0(T)$$

In this way, interpolating a second-order polynomial makes it possible to determine the coefficients $A_0(T)$, $A_1(T)$, and $A_2(T)$. The measurement method of the invention thus takes account of the way in which the pressure coefficient varies with temperature $A_1(T)$, the way in which the offset varies with temperature $A_0(T)$, and also the way in which the behavior of the sensor varies with pressure Pe ($A_2(T)$ whose behavior is also a function of temperature).

Numerical values are thus obtained for the various coefficients of the calculation model for obtaining the force F. During measurements of forces applied to a piece at the bottom of an oil well, for example, the response of the deformation sensor $R_{cap}$ is taken, Pe and T are determined as given by various sensors present downhole, and these values are injected into the calculation model as described above. The value of F is thus obtained which represents the force applied to the piece in a given direction and without disturbances due to the conditions under which the measurements are taken.

In an implementation of the measurement method, that is preferred but not limiting on the invention, the matrix models of equations [2] and [3] are simplified further. It can be assumed in the model that there is no variation in sensitivity to the force as a function of temperature. Under such circumstances, the coefficients $A_0(T)$ and $A_1(T)$ are not functions of temperature, which amounts to setting the coefficient $B_{02}$, $B_{01}$, $B_{12}$, and $B_{11}$ in equation [3] to zero. Furthermore, once preliminary tests have shown that the behavior of the deformation sensor is substantially linear as a function of pressure, it follows that the coefficient $A_2(T)$ can be taken as zero (with reference to equation [2]).

Using these simplified coefficients, equation [3] becomes:

$$F = K \cdot R_{cap} - (1 \ \ Pe \ \ Pe^2) \cdot \begin{pmatrix} B_{00} & 0 & 0 \\ B_{10} & 0 & 0 \\ 0 & 0 & 0 \end{pmatrix} \cdot \begin{pmatrix} 1 \\ T \\ T^2 \end{pmatrix} \quad [4]$$

In the same manner as that indicated above, the various coefficients can be determined by means of tests. The mechanical traction/compression test in which the pressure applied to the sensor is assumed to be zero gives the following result in application of equation [4]:

$$F = K.R_{cap} - B_{00}$$

Thus, plotting the curve of reference force as a function of sensor response, $F=f(R_{cap})$, enables the coefficients K and $B_{00}$ to be obtained respectively as the slope of the straight line and as its intercept on the ordinate.

Thereafter, assuming as before that the force applied to the deformation sensor is zero, the pressure test gives the following in application of equation [4]:

$$0 = K.R_{cap} - B_{10}.Pe - B_{00}$$

Whence:

$$K.R_{cap} = B_{10}.Pe + B_{00}$$

Thus, plotting the curve of the response of deformation sensor as a function of pressure, $(R_{cap})=f(Pe)$, makes it possible, by determining the slope of the straight line, to obtain the coefficient $B_{10}$.

FIGS. 1 and 2 show two embodiments of devices enabling the measurement method of the invention to be implemented. The purpose of such devices is to minimize the axial forces exerted by the surrounding pressure on the measurement test piece so as to minimize the difference between the "overall" force value and the "corrected" force value that genuinely represents the forces exerted on the test piece.

FIG. 1 shows a test piece body 1 possessing a central portion 2 and two ends 3. The outside diameter D2 of the central portion 2 is smaller than the outside diameter D3 of the ends 3. Conventional force-measuring gauges 4 are stuck to the middle of the central portion 2 thus making it possible to measure the "total" force to which the body 1 of the test piece is subjected. Thus, when a force is exerted on the test piece in the presence of an external pressure Pe, the detected force corresponds to the force actually applied to the piece, plus the product of the external pressure Pe multiplied by the effective surface area of the piece on which said pressure acts.

Since the measurement gauges are stuck to a location where the diameter of the test piece is reduced, the measurements of the "total" force applied to the piece is essentially increased by the axial force exerted by the surrounding pressure Pe. Thus, the correction applied by the measurement method of the invention is smaller than it would have been for a measurement taken using a test piece of outside diameter that remains constant. An associated pressure gauge and temperature gauge serve respectively to take account of the bottom effect and of the surrounding pressure.

FIG. 2 shows another embodiment of a device enabling the measurement method of the invention to be implemented. This device comprises a tubular test piece 10 of outside diameter that is constant along its entire length. An insert 20 is situated inside the test piece 10 so that said insert is not directly in contact with the inside walls of said test piece. The ends of the insert 20 are rigidly secured to two studs 30, themselves connected to the inside walls of the test piece 10. A conventional deformation sensor 40 is stuck on the insert 20 on the axis of the test piece 10.

In this way, the deformations measured by said sensor 40 are affected only by the radial component of the force exerted by the external pressure Pe. The difference between the total force measured by the gauges on the insert 20 and the force F exerted on the test piece 10 is thus smaller, independently of the external pressure. In the same manner as before, associated pressure and temperature gauges enable the other parameters taken into account by the measurement method of the invention themselves to be measured.

The above description shows that the measurement method of the invention enables the force F exerted on any piece to be determined regardless of the conditions under which force measurement is performed, and in particular when said measurement is performed in an environment where external pressure Pe is not negligible, and possibly even greater than the said force F exerted on said piece.

What is claimed is:

1. A method of measuring compression or tension forces (force F) exerted on a member such as a downhole tool or a drill string in a given direction, in the presence of an external pressure Pe and a temperature T, the method comprising the steps of:

measuring the response $R_{cap}$ of a deformation sensor to the total force exerted on the member;

determining said external pressure Pe and said temperature T; and determining the force F exerted on the member in said given direction by a relationship between the response of said deformation sensor ($R_{cap}$) and a polynomial function of degree n of the pressure Pe [$f_n$(Pe)] said relationship being such that:

$$F = K.R_{cap} - f_n(Pe)$$

where K is a constant determined by calibration of the sensor.

2. The method of claim 1, whereby the force F exerted on the member piece is determined by the relationship:

$$F = K \cdot R_{cap} - \sum_{i=0}^{n} A_i(T) \cdot Pe^i$$

the coefficients Ai(T) being a function of temperature T and being determined experimentally.

3. The method of claim 2, whereby the coefficients $A_i(T)$ are polynomial functions of temperature and of order m such that:

$$A_i(T) = \sum_{j=0}^{m} B_{ij} \cdot T^j$$

where the coefficients $B_{ij}$ are determined experimentally.

4. The method of claim 2, whereby the function $f_n(Pe)$ is a second-order polynomial function of pressure Pe (n=2).

5. The method of claim 2, whereby the coefficients $A_i(T)$ are second-order polynomial functions of temperature (m=2).

6. The method of claim 1, whereby the coefficient K is determined by a mechanical traction/compression test at constant temperature, the pressure Pe acting on the deformation sensor being assumed to be zero.

7. The method of claim 1, whereby the coefficient K is given by the slope of the straight line whose equation is as follows:

$$F = K.R_{cap} - A_0(T)$$

8. The method of claim 2, whereby the coefficients $A_i(T)$ are determined by a test under pressure and temperature, the force F exerted on the pressure measurement means being assumed to be zero.

9. The method of claim 8, whereby the coefficients $A_0(T)$, $A_1(T)$, and $A_2(T)$ are determined by second-order polynomial interpolation of the following curve $$K.R_{cap} = A_2(T).Pe^2 + A_1(T).Pe + A_0.$$

10. The method of claim 8, whereby the coefficients $A_0(T)$ and $A_1(T)$ are assumed to be constant with temperature and the coefficient $A_2(T)$ is assumed to be zero.

11. The method of claim 10, whereby the force F exerted on the member is given by the following matrix relationship:

$$F = K \cdot R_{cap} - \begin{pmatrix} 1 & Pe & Pe^2 \end{pmatrix} \cdot \begin{pmatrix} B_{00} & 0 & 0 \\ B_{10} & 0 & 0 \\ 0 & 0 & 0 \end{pmatrix} \cdot \begin{pmatrix} 1 \\ T \\ T^2 \end{pmatrix}.$$

12. The method of claim 1, in which the force exerted on the member comprising a cylindrical test piece (1) is measured, the method being characterized in that the measurement means (4) is situated on a portion (2) of the test piece that is of reduced diameter (D2).

13. The method of claim 1, in which the member comprises a tubular test piece (10), the method being characterized in that the measurement means (40) is situated on an insert (20) connected via studs (30) to the inside walls of said test piece (10).

* * * * *